(12) United States Patent
Qi et al.

(10) Patent No.: US 8,667,202 B2
(45) Date of Patent: Mar. 4, 2014

(54) METHOD OF POWERING ON HDD MODULES VIA CONNECTORS IN SERVER

(75) Inventors: Zhong-Ji Qi, Shanghai (CN); Zhong-Ying Qu, Shanghai (CN)

(73) Assignee: Inventec Corporation, Taipei (TW)

( * ) Notice: Subject to any disclaimer, the term of this patent is extended or adjusted under 35 U.S.C. 154(b) by 260 days.

(21) Appl. No.: 13/008,025

(22) Filed: Jan. 18, 2011

(65) Prior Publication Data

US 2012/0137113 A1    May 31, 2012

(30) Foreign Application Priority Data

Nov. 30, 2010    (TW) .............................. 99141474 A

(51) Int. Cl.
*G06F 13/00*    (2006.01)
*G06F 13/40*    (2006.01)

(52) U.S. Cl.
CPC .................................. *G06F 13/409* (2013.01)
USPC ......................................... 710/300; 710/302

(58) Field of Classification Search
USPC ............................ 713/300–340; 710/300–308
See application file for complete search history.

(56) References Cited

U.S. PATENT DOCUMENTS

| 6,553,501 | B1 * | 4/2003 | Yokoe | 713/320 |
| 6,661,123 | B2 * | 12/2003 | Hsu | 307/141 |
| 6,968,465 | B2 * | 11/2005 | Freevol et al. | 713/300 |
| 7,152,173 | B2 * | 12/2006 | Yuan | 713/330 |
| 7,934,107 | B2 * | 4/2011 | Walrath | 713/300 |
| 7,949,795 | B2 * | 5/2011 | Yoneyama | 710/5 |
| 8,122,235 | B2 * | 2/2012 | Khatri et al. | 713/2 |

* cited by examiner

*Primary Examiner* — Raymond Phan
(74) *Attorney, Agent, or Firm* — CKC & Partners Co., Ltd.

(57) ABSTRACT

A method of powering on a server is provided, wherein the server includes power consumption modules with the same functions, connectors, and a BIOS (Basic Input/Output System). The power consumption modules are connected to the server via the connectors respectively. This method includes the steps as follows. At first, the BIOS detects a delay power-up setting. When the delay power-up setting is detected, the BIOS staggers initialization times of the connectors, so that the connectors can be initialized respectively. When one of the connectors has been initialized, the connector is electrically connected to the corresponding power consumption module, so that the power consumption module can be delayed to be powered on.

9 Claims, 1 Drawing Sheet

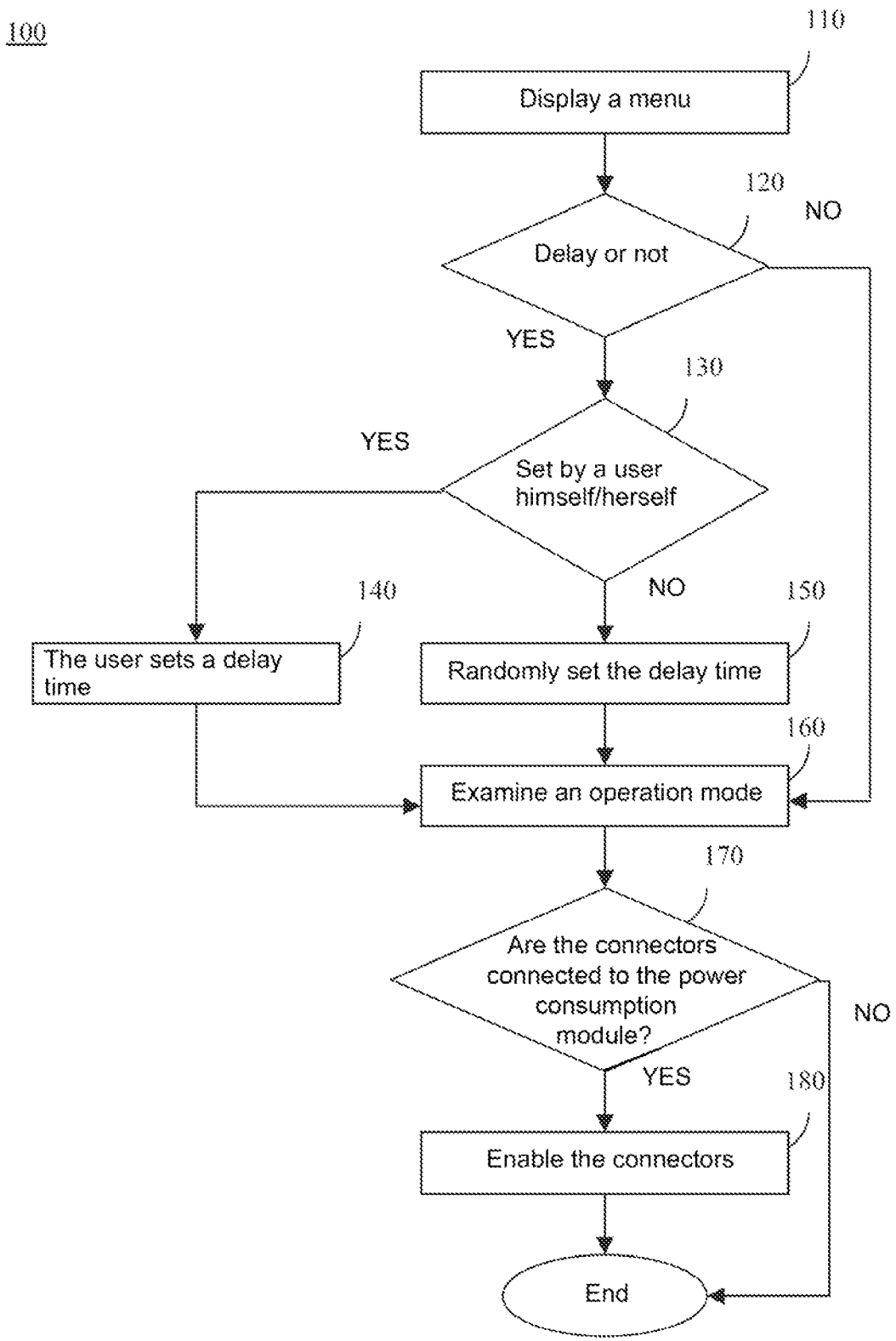

METHOD OF POWERING ON HDD MODULES VIA CONNECTORS IN SERVER

RELATED APPLICATIONS

This application claims priority to Taiwan Application Serial Number 099141474, filed Nov. 30, 2010, which is herein incorporated by reference.

BACKGROUND

1. Field of Invention

The disclosure relates to a powering on method, and more particularly, to a method of powering on a server.

2. Description of Related Art

In recent years, with the industrial and commercial development and the society progress, products are provided under the theme of convenience, certainty, and economy. Therefore, the currently developed products are more advanced than ever, thereby serving the society better.

As hardware, a server often refers to a computer having high computation capability and rendering for plural users. The server differs from a PC in many aspects. For instance, the PC usually serves one user at one moment. The server is different from a host in that, the host is used by the user through a terminal and the server is used by a client user over a network.

According to different computation capabilities, the server can be classified as a working group server, a department server and an enterprise server. A server operating system refers to the operating system which is performed on the server hardware. The server operating system needs to manage and make full use of the computation capability of the server hardware and is provided to be used by software of the server hardware.

One server rack can hold dozens of plates, and one cabinet or machine room has many racks. Therefore, when the machines are powered on at the same time, the power loading is rather high. Since an HDD (Hard Disk Drive) has a great influence on instantaneous actuation power consumption, generally, after a server is powered on, a peak value of the power occurs in the HDD initialization stage. On one hand, the superposition of the peak values may cause too high instantaneous actuation power consumption, and on the other hand, the input over-current may damage the HDD.

Therefore, the existing method still has inconvenience and defects apparently, and needs further improvement. In order to solve the above problems, those skilled in the art have been trying hard to find a solution, but no applicable method is put forward. Therefore, it is an important topic and also an object regarding how to avoid the peak time of power after power on.

SUMMARY

Therefore, an aspect of the disclosure is to provide a method of powering on a server, to avoid the peak time of power after power on, scatter the power loading and moderate waveform thereof.

According to an embodiment of the disclosure, a server includes a plurality of power consumption modules with the same functions, a plurality of connectors, and a BIOS (Basic Input/Output System). Each of the power consumption modules is connected to the server via the connectors respectively. This method of powering on the server includes the steps as follows. The BIOS detects a delay power-up setting. When the delay power-up setting is detected, the BIOS staggers initialization times of the connectors so that the connectors can be initialized respectively. When one of the connectors has been initialized, the connector is electrically connected to the corresponding power consumption module, so that this power consumption module can be delayed to be powered on.

The aforementioned delay power setting includes receiving a delay time to input by a user, and setting the staggered initialization times of the connectors based on the delay time.

Alternatively, the aforementioned delay power-up setting includes randomly setting the staggered initialization times of the connectors.

Each motherboard has a BMC (baseboard management controller), and the step of randomly setting the staggered initialization times includes the steps as follows. Each BMC is initialized. Each BMC is used to acquire an identification code of the corresponding motherboard, wherein the identification codes of the motherboards are different. A corresponding delay time is generated based on the identification code of each motherboard.

The aforementioned method of powering on the server further includes examining an operation mode of the one of the connectors and temporarily storing the operation mode of the connector when the one of connectors is initialized.

The aforementioned server may include a plurality of motherboards, and each motherboard has a plurality of power consumption modules and a plurality of connectors. The step of BIOS staggering initialization times of the connectors includes staggering initialization times of the connectors located on different motherboards.

Alternatively, the step of BIOS staggering initialization times of the connectors further includes staggering the initialization times of the connectors located one the same motherboard.

Moreover, the step of staggering the initialization times of the connectors located on the same motherboard further includes respectively enabling the connectors.

The aforementioned power consumption module is an HOD module.

Connectors connected to the power consumption module are found out, and connectors connected to the HDD are powered on one by one.

In view of the above, as compared with the existing technology, the technical solution of this disclosure has obvious advantages and benefits. The above technical solution may achieve considerable technical progress and have a wide use value in industry. This disclosure has at least the following advantages.

1. This technical solution adopts the method of staggering initialization times of the connectors in the macro level and initializing the connectors one by one in the micro level to lower the risk that the HDD is damaged by the input instantaneous over-current when powered on.

2. The instantaneous actuation power consumption is optimized, thereby improving the stability of the server.

It is to be understood that both the foregoing general description and the following detailed description are by examples, and are intended to provide further explanation of the technical solution of this disclosure.

BRIEF DESCRIPTION OF THE DRAWINGS

In order to make the following as well as other aspects, features, advantages, and embodiments of the disclosure more apparent, the accompanying drawings are described as follows:

FIG. 1 is a flow chart showing a method of powering on a server according to an embodiment of the disclosure.

DETAILED DESCRIPTION

Reference will now be made in detail to the present embodiments of the invention, examples of which are illustrated in the accompanying drawings. The same reference numbers used in the drawings refer to the same or like elements. On the other hand, well-known elements and steps are not described in the embodiments to avoid causing unnecessary limitations to the present invention.

In practice, multiple motherboards may be disposed in a server, and each motherboard may be connected to several HDDs. Since the HDD has a great influence on instantaneous actuation power consumption, generally, after the server is powered on, a peak value of the power occurs in the HDD initialization stage. In view of the above, a technical aspect of the present invention is a control method, which is applicable to a server or is widely applied in the relevant technology. It should be noted that the application of the control method can effectively avoid the peak time of power after the server is powered on; scatter the power loading and moderate waveform of power. Specific embodiments of the control method of this disclosure are illustrated with reference to FIG. 1.

FIG. 1 is a flow chart showing a method 100 of powering on a server according to an embodiment of the disclosure. In this embodiment, the method 100 is applicable to a server, and the server includes a plurality of power consumption modules with the same functions, a plurality of connectors, and a BIOS. Each of the power consumption modules is connected to the server via the connectors respectively. For instance, the power consumption module may be an HDD module and/or another electrical device. In the method 100 of powering on the server, the BIOS detects a delay power-up setting. When the delay power-up setting is detected, the BIOS staggers initialization times of the connectors so that the connectors can be initialized respectively. When one of the connectors has been initialized, the connector is electrically connected to the corresponding power consumption module, so that this power consumption module can be delayed to be powered on.

More particularly, as shown in FIG. 1, the method of powering on a server 100 includes steps 110-180 (It should be appreciated that the sequence of the steps mentioned in this embodiment may be adjusted or the steps may even be executed simultaneously or partially simultaneously as required unless specified otherwise).

In a menu step 110, a menu may be displayed on a screen for a user to select. This menu aims to allow the user to select whether to make a corresponding delay before the connectors are configured. For instance, "Delay before SATA Init" is displayed on the screen to inquire the user whether to make the corresponding delay before the SATA is configured.

Then, the user can use a touch device or a keyboard to select whether to make the corresponding delay before the connectors are configured. In a determining step 120, the selection of the user is determined. If the user selects not to delay, the method 100 proceeds to step 160. In contrast, if the user selects to delay, the method 100 proceeds to step 130.

In an inquiry step 130, the information inquiring the user whether to set the delay time himself/herself is displayed on the screen. Then, the user can select whether to set the delay time himself/herself with the touch device or the keyboard. If the user selects to set the delay time himself/herself, the user can input the delay time with the touch device or the keyboard. In a user setting step 140, the delay time input by the user is received and then the staggered initialization times of the connectors are set based on the delay time.

In contrast, if the user selects not to set the delay time himself/herself, in a randomly setting step 150, the staggered initialization times of the connectors are randomly set. In the randomly setting step 150, each BMC may be initialized, and each BMC is used to acquire an identification code of the corresponding motherboard. The identification codes of the motherboards are different, and then a corresponding delay time is generated based on the identification code of each motherboard.

Thereafter, when one of the connectors is initialized, in a mode examining step 160, an operation mode of one of the connectors is examined and the operation mode is temporarily stored for the convenience of subsequent operations. The operation mode may be, for example, IDE (Integrated Drive Electronics), AHCI (Advanced Host Controller Interface), RAID (Redundant Array of Independent Disks), etc.

In an HDD examining step 170, all the connectors connected to the power consumption module are found out, and all the connectors connected to the HDD are powered on one by one. The examination mechanism is known to those skilled in the art, and the details thereof will not be stated herein. In this embodiment, the HDD may be, for example, a conventional HDD, a solid HDD or any similar storage device.

In an actuation step 180, the server has a plurality of motherboards, and each motherboard has a plurality of power consumption modules and a plurality of connectors. The step of BIOS staggering initialization times of the connectors includes staggering the initialization times of the connectors located on different motherboards. Alternatively, the step of BIOS staggering the initialization times of the connectors further includes staggering the initialization times of the connectors located on the same motherboard. The step of staggering the initialization times of the connectors located on the same motherboard further includes respectively enabling the connectors. In this manner, this method 100 is effective to avoid the peak time of power after the server is powered on; scatter the power loading and moderate waveform of power.

The method 100 of powering on the server may be executed by software, hardware and/or firmware. For instance, if the execution speed and accuracy are significantly considered, the hardware and/or firmware may be selected. If the design flexibility is significantly considered, the software may be selected. Alternatively, the software, hardware and firmware may operate collaboratively. It should be understood that the above examples have no preferences and should not be regarded as the limitations to this disclosure. Those skilled in the art can make flexible design optionally when required.

Furthermore, those of ordinary skill in the art should understand that the respective steps of the method 100 of powering on the server are named according to the functions that they execute. The steps are provided for making the technique of the disclosure easy to be understood and should not be regarded as the limitations to the disclosure. The steps may be integrated into one step or split into plural steps, or any step may be executed in another step, which shall fall within the scope of the disclosure.

In practice, the major steps 100 of the method of powering on the server may be enabled by the BIOS of the server, and part of the functions may also be made into a software program and stored in a computer readable recording media, such that the server reads the recording media and then the operation system thereof executes the method 100 of powering on the server.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A method of powering on a server, wherein the server comprises a plurality of HDD (Hard Disk Drive) modules with the same functions, a plurality of connectors, and a BIOS (Basic Input/Output System), and each of the HDD modules is connected to the server via the connectors respectively, the method comprising:
   detecting a delay power-up setting by the BIOS;
   staggering initialization times of the connectors by the BIOS when the delay power-up setting is detected;
   initializing each of the connectors respectively;
   wherein, when one of the connectors is initialized, the one of the connectors is electrically connected to the corresponding HDD module, so that the HDD module is delayed to be powered on.

2. The method of claim 1, wherein the delay power-up setting comprises:
   receiving a delay time input by a user; and
   setting the staggered initialization times of the connectors based on the delay time.

3. The method of claim 1, wherein the delay power-up setting comprises:
   randomly setting the staggered initialization times of the connectors.

4. The method of claim 1, wherein each of the motherboards comprises a baseboard management controller (BMC), and the step of randomly setting the staggered initialization times of the connectors are comprises:
   initializing each of the baseboard management controllers;
   acquiring an identification code of the corresponding motherboard by each baseboard management controller, wherein the identification codes of the motherboards are different; and
   generating a corresponding delay time based on the identification code of each of the motherboards.

5. The method of claim 1, further comprising:
   examining an operation mode of the one of the connectors and temporarily storing the operation mode when the one of connectors is initialized.

6. The method of claim 1, wherein the server comprises a plurality of motherboards, each of the motherboards comprises some of the HDD modules and some of the connectors, and the step of staggering the initialization times of the connectors by the BIOS comprises staggering the initialization times of the connectors located on the different motherboards.

7. The method of claim 1, wherein the step of staggering the initialization times of the connectors by the BIOS further comprises staggering the initialization times of the connectors located on the same motherboard.

8. The method of claim 1, wherein all of the connectors connected to the HDD module are found out, and all of connectors connected to an HDD are powered on one by one.

9. The method of claim 7, wherein the step of staggering the initialization times of the connectors located on the same motherboard further comprises respectively enabling the connectors.

* * * * *